Figure 1:
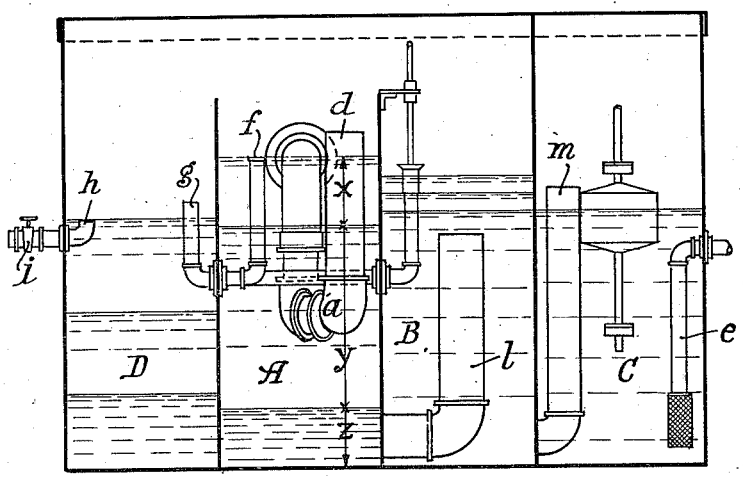

Oct. 27, 1936.  K. JAGSCHITZ  2,058,459

COLLECTING AND PURIFYING DEVICE FOR A WATERLESS GASHOLDER

Filed Jan. 7, 1933

INVENTOR
KONRAD JAGSCHITZ
BY
ATTORNEY

Patented Oct. 27, 1936

2,058,459

UNITED STATES PATENT OFFICE 2,058,459

COLLECTING AND PURIFYING DEVICE FOR A WATERLESS GASHOLDER

Konrad Jagschitz, Mainz, Germany, assignor to Maschinenfabrik Augsburg-Nuernberg A. G., Nuremberg, Germany Application January 7, 1933, Serial No. 650,642
In Germany January 9, 1932

3 Claims. (Cl. 48—174)

It is known to collect in receptacles the sealing liquid discharged from the so-called bottom cup of a disk gasholder provided with a liquid sealing, said receptacle being arranged at the foot of the gasholder, and the liquid collected therein being freed from the impurities it contains and being then pumped upwardly to the gasholder in order to be conducted back into the sealing device of the same, to return finally into said bottom cup, and so to make again and again its way through the circuit.

The impurities (dust, water, and the like) which the liquid sealing substance takes up as it circulates are separated in the above-mentioned receptacles and are then conducted away. Various constructional forms of said receptacles have become known up to the present time; generally, they consist of a plurality of vessels connected in series as regards the flow of the liquid, the first thereof receiving the impure liquid or mixture from the gasholder bottom cup; the liquid or mixture passes then through consecutive chambers, in each of which it remains for a certain period of time and in which the several components of the mixture separate from one another according to their specific weight, sometimes with the aid of heat.

The present invention is an improvement of purifying devices of the type in which the liquid mixture flowing away from the bottom cup and consisting of the liquid sealing substance proper (tar, tar-oil, or the like), water, and other impurities, is introduced into the purifying apparatus, which consists of a plurality of chambers below the level of the liquid contained in the first chamber in order to shut off the interior of the apparatus from the outer air. With this arrangement the separation of the water is, however, difficult, as the water must overcome a considerable head before it arrives at the surface where it collects. The liquid sealing substance itself has, a specific weight of about 1.1, so that the water floats upon it and can be led off through an overflow. The difficulty in separating the water from the oil is due to the fact that the viscosity of the water-oil emulsion which collects in the first chamber up to a considerable height is very great, and consequently great friction arises between the rising water and said emulsion, which must be overcome by the buoyancy of the water in the emulsion. This friction is often so great that it becomes impossible for the water to rise to the surface, and as continually more of the mixture arrives in said chamber the mixture passes from the first chamber into the second and there arises, thus, the risk, that the sealing liquid returning finally, on completing the circuit, into the gasholder bottom cup is rich in water and, therefore, unsuited for its purpose.

Now, according to the present invention, the supply of the impure mixture from the bottom cup to the first chamber of the purifying device is effected by means of a U-shaped pipe or gooseneck, the discharge orifice of which is located above the level of the liquid contained in said first chamber, the water thus discharging from said pipe directly onto the surface of the water whereby the advantage is attained that the water need no more cover the long distance through the column of liquid present in the said chamber, but can pass out through the water-separating chambers directly from the surface of the liquid present in the first chamber. The oil sinks quickly at the outer surface of the syphon pipe wall, preferably through a layer of water specially provided on the sealing liquid proper; the oil passes easily through said layer of water which has a thickness of from 250 to 300 mm.; the friction between the oil and the water surrounding it is comparatively slight.

Besides improving the separation of the water, the invention presents also the advantage that the purifying device can be operated in a continuous manner. Hitherto, the attendant was compelled to delay opening the discharge cocks connected to the overflow members until a sufficiently large amount of water had separated out and collected. Keeping said cocks continually open was impossible as the danger existed that the separation of the water would cease and hence water and oil would be discharged. With the present improved constructional form the separation of the water takes place without any difficulty and all discharge cocks may, therefore, be continually open to such an extent that a continual discharge of the water takes place.

It is of advantage to discharge the water not from the first chamber but from a precipitation chamber which receives the water from said first chamber and in which small amounts of oil or emulsion that may have assembled therein owing to the contents of the chambers having been at rest for a certain longer time can deposit. Also this precipitation chamber receives the liquid through a pipe terminating above the level of the liquid contained in the chamber so that also here the same advantages are obtained as with the supply of the impure sealing liquid from the bottom cup into the first chamber.

In order to reduce greatly the possibility of the formation of fresh emulsion or of the mixing of the water with other substances carried along with the liquid, it is to be preferred to build the two chambers together so as to make them form a constructional unit.

Figure 2:
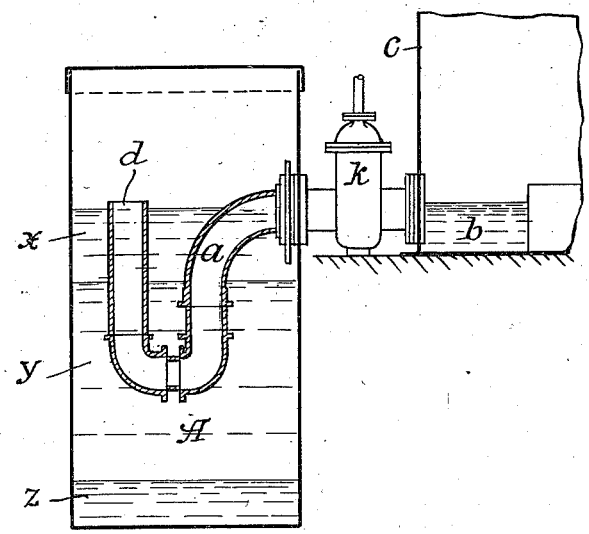

The invention is illustrated diagrammatically and by way of example on the accompanying drawing on which Figure 1 is a vertical longitudinal section through a collecting and purifying device designed according to this invention, this figure showing all chambers of the device, and Figure 2 is a vertical section through one of said chambers (A), this section lying at right angles with respect to Fig. 1 and being viewed from the right, and Fig. 2 showing also how the device is connected to the bottom cup of a disk gasholder.

The device has four chambers A, B, C and D, of which A is connected to the bottom cup $b$ of the gasholder $c$ by the intermediary of a sluice valve $k$, as shown in Fig. 2. In the chamber A is provided a downwardly bent pipe $a$, one leg of which is connected with said valve $k$, and the other leg of which terminates freely at $d$ above the level of the liquid contained in said chamber, the two legs $a$ and $d$ thus forming a U-shaped discharge pipe. The valve $k$ is normally open, and the impure mixture that has collected in the cup $b$ flows continually from this cup into the chamber A through the pipe $a$. The liquid in the chamber A forms three layers, viz. an upper layer $x$ of water, a bottom layer $z$ of pure tar oil, and an intermediate layer $y$ of emulsion.

From the partition wall separating the chambers A and B a pipe $l$ (Fig. 1) extends upwardly into the chamber B and terminates somewhat below the level of the liquid substance contained in this chamber in which impurities eventually still carried along with the tar can separate. A similar pipe extends from the partition wall between the chambers B and C into the latter chamber, but terminates above the surface of the liquid therein contained. In this chamber is a float, as shown in Fig. 1, but as the arrangement, the manner of operation, and the object of the float are known and the float does not form a part of the present invention it is unnecessary to describe the same in detail.

$e$ (Fig. 1) is a suction pipe of the pump (not shown) by means of which the purified liquid substance is conveyed from the chamber C back to the packing or sealing gutter (also not shown) of the gasholder, that is to say, back into the circuit.

The water $x$ that has been separated in the chamber A from out of the emulsion $y$ passes through another U-shaped pipe $f$, $g$ into the precipitation chamber D. This pipe is an overflow pipe, and the orifice of the leg $f$ and the level of the water $x$ lie, therefore, in one plane, whereas the orifice of the leg $g$ which is shorter than $f$ lies somewhat above the level of the water in the chamber D. Emulsion and tar that may, perhaps, have been carried along with the water flowing from the chamber A into the chamber D can separate in this chamber, whereas the water is discharged through the overflow pipe $h$ and the cock $i$. This cock can be kept open in proportion to the amount of water discharged so that a continual operation of the device is obtained.

It will be noted that the bottom of the U-pipe $a$, $d$ is located below the level of the sealing liquid in the bottom cup of the gasholder. A body of sealing liquid is thus always retained within the pipe, so that the latter serves additionally as a seal which prevents escape of gas from the gasholder and also the entry of air thereinto.

The operation of the above-described apparatus is as follows:

In the chambers A, B and D, the impure sealing liquid comes to complete rest, as the contents of these chambers are very large and the inflow of liquid is comparatively small. There thus occur successive separations in these chambers in accordance with the specific weights of the components. The tar or tar oil sinks to the bottom while the water collects at the surface whence it is drawn off and ultimately is discharged through the valve $i$ connected with the overflow of the chamber D. The mass of tar or tar oil which has sunk to the bottom of the chamber A reaches the chamber B through the large tube $l$ which leads from the bottom of the chamber A. In the chamber B any water that has been carried along separates at the surface and can be carried off through a narrow tube opening at the surface of the liquid and is led into the chamber D. Into the latter chamber there flows also the water from the chamber A discharged by the overflow $f$. Any sealing liquid which is carried along collects at the bottom of the chamber D while the substantially oil and tar-free water is removed continuously or periodically through the valve $i$. From the chamber B the purified sealing liquid flows through pipe $m$ into the chamber C from which, under the control of the float illustrated in the drawing, it is fed to the suction pipe $e$ of a pump (not shown) and introduced into the gasholder in known manner.

I claim:

1. The combination with the bottom cup of a waterless gasholder having a seal supplied with a nonaqueous liquid sealing means of a specific gravity greater than that of water, of apparatus for collecting and purifying the impure liquid mixture resulting from contamination by water, tar and the like leaving said bottom cup, said apparatus comprising a plurality of separating chambers for separating the water from the other components of the mixture, said water collecting at the top of the bodies of liquid in said chambers, an overflow pipe for said water leading from the first chamber into the next chamber, a U-shaped pipe leading from the bottom cup of the gasholder and directing the liquid from said cup into said first chamber, said pipe being connected with the said bottom cup and having the bottom of the U below the level of the sealing liquid in said cup and terminating at its discharge end above the level of the overflow opening and thus above the level of the liquid contained in said first chamber, whereby the sealing liquid in said pipe acts as a seal preventing escape of gas from the gasholder and the water in said liquid mixture reaches the surface of the supernatant body of water in said chamber immediately upon discharge from the pipe and flow of the separating water through a layer of sealing liquid is avoided, and a conduit for withdrawing the non-aqueous liquid from the first chamber.

2. The combination as specified in claim 1, wherein the second chamber is joined directly to the first chamber into a single constructional unit and is provided with a discharge opening for the water, and wherein said overflow pipe is of U-form and terminates in said second chamber above the level of said discharge opening.

3. The combination with the bottom cup of a waterless gasholder having a seal supplied with a nonaqueous liquid sealing means of a specific gravity greater than that of water, of apparatus for collecting and purifying the impure liquid mixture resulting from comtamination by water, tar and the like leaving said bottom cup, said apparatus comprising a separating chamber, an overflow arrangement for leading off the separated water from said chamber, a pipe leading from the bottom cup of the gasholder and having its discharge opening located above the level of the dividing surface between the bodies of water and sealing liquid in said separating chamber whereby the water in said mixture is directed into a body of water immediately upon discharge from said pipe and flow of the separating water through a layer of sealing liquid is avoided, said pipe having a downwardly directed return bend below the level of sealing liquid in the bottom cup, whereby a body of sealing liquid permanently fills said bend and operates to seal the bottom cup against the escape of gas, and a conduit for drawing off the separated non-aqueous liquid.

KONRAD JAGSCHITZ.